H. ADELMANN.
HAM SHAPER.
APPLICATION FILED FEB. 25, 1916.
1,206,494.
Patented Nov. 28, 1916.
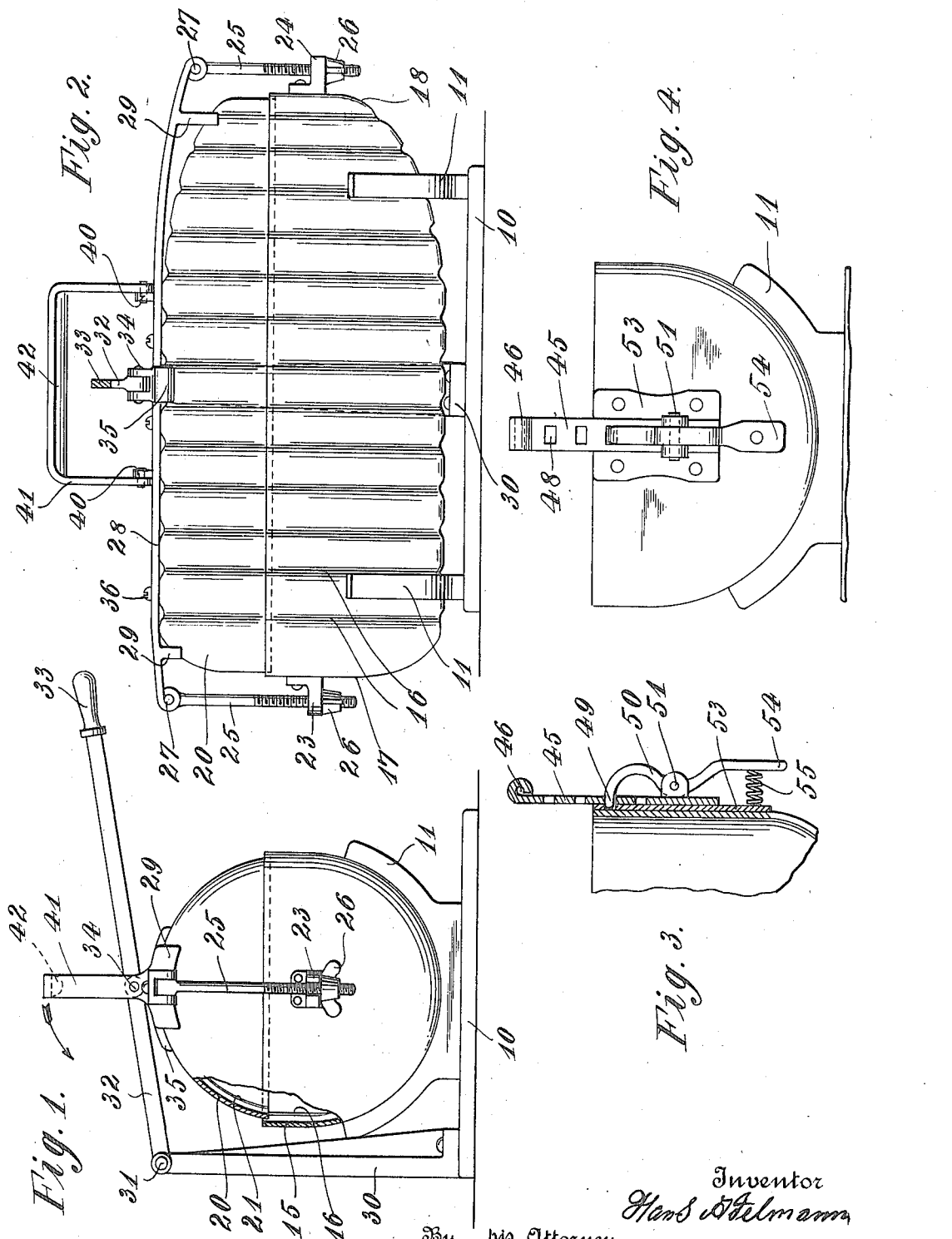
Inventor
Hans Adelmann
By his Attorney
Alfred Tschinkel

UNITED STATES PATENT OFFICE.

HANS ADELMANN, OF NEW YORK, N. Y., ASSIGNOR TO HAM BOILER CORPORATION, OF NEW YORK, N. Y., A CORPORATION OF NEW YORK.

HAM-SHAPER.

1,206,494.     Specification of Letters Patent.     Patented Nov. 28, 1916.

Application filed February 25, 1916. Serial No. 80,434.

*To all whom it may concern:*

Be it known that I, HANS ADELMANN, a subject of Germany, resident of 1970 Mapes avenue, New York, in the county of New York and State of New York, have invented certain new and useful Improvements in Ham-Shapers, of which the following is a specification.

This invention relates to improvements in cooking meats, with particular reference to hams and corned beef and the like, in which the meats are preferably delivered in a compressed form, suitable for slicing, the bones and inedible parts being removed preliminary to the cooking.

The principal object of the invention is to provide a receptacle in which the meats are placed to be cooked, the receptacle being provided with a cover fitting the main or body portion, so that it may be entered therein under the spring compression, so that irrespective of the expansion or contraction of the meats, the same will be held firmly together.

Another object is to provide an apparatus which will indent the meat along its exterior surface similative to the appearance produced by winding the same with a string, and finally to avoid the loss of time encountered by the use of common appliances for such purpose, the pressure means being operated automatically in the present invention.

These and other objects, such as simplicity and durability of parts and low cost of manufacture are secured by the novel construction and combination of parts hereafter described and shown in the accompanying drawing, and in which:—

Figure 1 is an end elevation of the complete apparatus, parts being broken away to show the construction. Fig. 2 is a side elevation of the same. Fig. 3 is a fragmental view, showing a modified form of clamping means, and Fig. 4 is an end view of the same.

The entire apparatus is intended to be placed in a suitable vat or tank in which is contained water, so that the water may be raised to a boiling point, the meats being packed within the receptacle as will be clearly evident.

The apparatus consists of a base plate 10 upon which are secured standards 11 near its ends, the same supporting a substantially semi-elliptical hollow casing 15, preferably made of sheet steel and provided with a plurality of undulations 16, uniformly spaced, the inwardly extending portions of which serve to indent the meat so that the same will have the appearance of having been bound with a cord in the manner in which such pressed meats are usually prepared. A further object of the undulations is to guide the upper casing element 20 provided with engaging sinuosities 21 and suited to be received closely within the outer casing along its lateral and end edges. Secured to the larger end plate 17 of the lower casing is a bracket 23, a similar bracket 24 being affixed to the smaller conical end 18, these brackets having bifurcated openings at their front receptive of the bolts or rods 25 which may be clamped therein, by means of the wing nuts 26. The bolts 25 are engaged by the pivots 27 with a spring bar element 28, secured to the top of the upper casing and engaged thereby by clips 29 so as to press uniformly downward when the wing nuts 26 are properly adjusted. In the practice of this device after the ham is introduced into the casing, one of the first operations is to apply sufficient power to the compressing means to properly shape or form the ham, so as to simulate in the finished product a cooked ham that has been wrapped with a cord. The clips or lugs 29 carried near the free ends of the spring 28, coming into direct contact with the ends of the upper casing or lid 20 provide, therefore, a means whereby full power may be applied to the compressing screws 25 for molding or forming a ham without straining or damaging the spring. After this compression or molding action is completed, the nuts 26 are sufficiently loosened to allow the resilient means between the two casing elements to come into proper play and accommodate the device to the natural expansion of the meat due to the cooking operation. Another standard 30 is secured to the base 10, the same being positioned to one side of the casings and provided with a pivot 31, carrying a lever 32 of the second class having a handle 33, the lever being pivoted at 34 to the central clamp plate 35 to which is attached the spring bar element 28 at its center, so that when the lever is raised, the upper casing will be raised with it by reason of engagement between the spring and the casing through the screws 36. Also engaged with the spring 28 are lugs 40 to which are pivotally secured the vertical elements 41 of a handle 42, so that when the structure is closed it can be raised and transported bodily by means of the handle.

In place of the fastening means 23 to 26 inclusive, there may be used a flat bar 45 to which the spring element 28 may be pivoted at 46, the bar being provided with a plurality of openings 48 adapted to receive the point 49 of a lever 50, pivoted at 51, to a bracket 53, and provided with an operating handle 54, the latter being normally pressed outwardly by the push spring 55. In this adaptation, pressure applied to the handle 54 will cause the point 49 of the lever to be retracted from the openings 48 in the bar or rod 45 which may be adjusted downward forcibly by means of the lever 32 so that the point may reënter other of the openings changing the tension in the spring bar 28.

From the foregoing it will be seen that the apparatus disclosed presents a practical and novel device for cooking pressed meats so that the same will be delivered in an approved form and that the meats will be compressed so that no cavity will exist therein, the compression being obtained by substantial and automatic means, that adjustments are provided so that the pressure on the meat is uniform regardless of the quantity contained therein and that the entire device is readily portable.

Having thus described my invention, what I claim as new and desire to secure by Letters Patent is:—

1. In a meat mold, the combination of a lower casing, an upper casing receivable therewithin, means for resiliently pressing said casings together, and means for varying the effect of the resilience of said pressing means.

2. In a meat molding device, the combination of a hollow lower casing, an upper casing receivable in said lower casing, peripheral corrugations formed with both of said casings, and means for resiliently clamping said upper casing with respect to said lower casing.

3. In a meat mold, the combination with the frame, and a semi-elliptical lower casing having a circular cross section disposed in said frame, of a correspondingly shaped upper casing receivable in said lower casing, means for clamping said upper casing resiliently to said lower casing, and means for varying the effect of the resiliency of said clamping means.

4. In a meat shaper, the combination of two relatively movable and coöperating casings, said casings having circumferentially arranged inwardly projecting ribs, and means to cause one of the casings to forcibly approach the other.

5. In a meat shaper, the combination of a lower relatively stationary casing, an upper casing movable up or down with respect to the lower casing, a hand lever having stationary pivotal connection at one end and pivotally connected intermediate of its ends to the upper casing whereby when the free end of the lever is depressed the upper casing will be forced downwardly, and means projecting beyond and below the ends of the upper casing to interlock with the ends of the lower casing to connect the two casings together.

6. In a ham shaper, the combination of a relatively stationary lower casing, a base supporting the same, a standard extending upwardly at one side of the casing, a relatively movable upper casing coöperating with the lower casing, a spring bar connected to the upper surface of the upper casing and extending longitudinally and beyond the ends thereof, the ends of the spring bar being adapted to move relatively to the ends of the upper casing, pairs of bars and brackets serving to connect the free ends of the spring bar with the ends of the stationary casing, and a lever of the second class fulcrumed to the upper end of said standard and pivotally connected to the middle portion of the upper casing whereby by manipulation of the handle end of the lever the upper casing may be forced toward or from the stationary casing.

7. In a meat shaper, the combination of a relatively stationary casing, a movable casing coöperating therewith, a spring bar extending longitudinally of and beyond the upper portion of the movable casing, said bar being connected rigidly to the movable casing at its middle portion, the end portions thereof being free to move relatively upwardly from the movable casing, clamping means extending between the ends of the stationary casing and the ends of the spring bar tending to draw said ends of the bar downwardly toward the ends of the movable casing and engagement clips carried by the ends of the bar for coöperation with the ends of the movable casing to limit such movement of the ends of the spring.

Signed at New York in the county of New York and State of New York this the 19th day of February A. D. 1916.

HANS ADELMANN.

Witnesses:
WILLIAM BOHNERT,
PAUL SCHÜPPEL.